(12) United States Patent
Barbedor et al.

(10) Patent No.: US 11,727,068 B2
(45) Date of Patent: Aug. 15, 2023

(54) CUSTOMIZABLE INTENT DRIVEN APPLICATION TRIGGERING SYSTEM

(71) Applicant: Salesforce, Inc., San Francisco, CA (US)

(72) Inventors: Franck Barbedor, Grenoble (FR); Thomas Foulon, Grenoble (FR); Florent Rochette, Grenoble (FR); Christophe Mourot, Grenoble (FR)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/537,323

(22) Filed: Nov. 29, 2021

(65) Prior Publication Data
US 2023/0169127 A1    Jun. 1, 2023

(51) Int. Cl.
*H04L 67/02* (2022.01)
*G06F 3/0482* (2013.01)
*G06F 16/95* (2019.01)
*G06N 20/00* (2019.01)

(52) U.S. Cl.
CPC ............ *G06F 16/95* (2019.01); *G06F 3/0482* (2013.01); *G06N 20/00* (2019.01); *H04L 67/02* (2013.01)

(58) Field of Classification Search
CPC ....... G06F 16/95; G06F 3/0482; G06N 20/00; H04L 67/02
See application file for complete search history.

(56) References Cited

U.S. PATENT DOCUMENTS

| | | | |
|---|---|---|---|
| 2013/0097270 A1* | 4/2013 | Plotkin | H04M 1/72484 709/206 |
| 2017/0256256 A1* | 9/2017 | Wang | G10L 15/30 |
| 2019/0124020 A1* | 4/2019 | Bobbarjung | G06Q 20/123 |
| 2019/0180258 A1* | 6/2019 | Amar | H04L 51/02 |
| 2019/0325081 A1* | 10/2019 | Liu | H04L 63/102 |
| 2020/0050693 A1 | 2/2020 | Obembe et al. | |
| 2021/0026606 A1* | 1/2021 | Kessler | G10L 15/22 |
| 2021/0397796 A1* | 12/2021 | Dounis | G06F 40/253 |

* cited by examiner

*Primary Examiner* — Jennifer N Welch
*Assistant Examiner* — Kc Chen
(74) *Attorney, Agent, or Firm* — Kwan & Olynick LLP

(57) ABSTRACT

Disclosed are some implementations of systems, apparatus, methods and computer program products for implementing a customizable intent driven action triggering system. The system retrieves, for at least a first intent, a corresponding list of actions. The system provides, to a first client device associated with a first user account, a first graphical user interface (GUI) identifying the first intent, the list of actions, and for at least the first action in the list of actions, a corresponding user-selectable option configurable to indicate whether the first action is activated for the first intent in association with the first user account. The system processes a first request received from the first client device in association with the user-selectable option, where the first request indicates that the first action is activated for the first intent in association with the first user account. The system updates user account specific settings associated with the first user account such that the user account specific settings indicate that the first action is activated for the first intent. Responsive to detecting the first intent in a second request received in association with the first user account, the system executes activated actions associated with the first intent according to the user account specific settings.

17 Claims, 12 Drawing Sheets

[Virtual Me] Preferences

This interface informs you about the configuration of your Virtual Me and lets you configure your preferences.

⌄ Slack configuration

Status

You're authentified to your Virtual Me as Thomas Foulon on Slack.
To change this, please go on the Slack Virtual Me's application home page.

Favorite Slack channel — 402

[ #general ▾ ]

The channel you choose will be the one where messages will be posted on your behalf if you requested it.

⌄ Other preferences

Timezone

Your timezone is set at Europe/Brussels.
This configuration is updated accordingly to the timezone you set on your Slack profile.

Confirmation configuration — 404

[+] Activate this option if you want your Virtual Me to ask you a confirmation before taking any action on your behalf.

*Figure 4A*

CUSTOMIZABLE INTENT DRIVEN APPLICATION TRIGGERING SYSTEM

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques for implementing a customizable intent driven system. More specifically, this patent document discloses techniques for executing actions in association with intents detected in requests according to user account specific settings.

BACKGROUND

"Cloud computing" services provide shared network-based resources, applications, and information to computers and other devices upon request. In cloud computing environments, services can be provided by servers to users' computer systems via the Internet and wireless networks rather than installing software locally on users' computer systems. A user can interact with social networking systems, electronic mail (email) systems, instant messaging systems, and other software applications in a cloud computing environment.

BRIEF DESCRIPTION OF THE DRAWINGS

The included drawings are for illustrative purposes and serve only to provide examples of possible structures and operations for the disclosed systems, apparatus, methods and computer program products for facilitating implementation of a customizable intent driven system. These drawings in no way limit any changes in form and detail that may be made by one skilled in the art without departing from the spirit and scope of the disclosed implementations.

FIG. 4A shows an example graphical user interface (GUI) 400 via which user preferences can be configured, in accordance with some implementations.

DETAILED DESCRIPTION

Figure 1:
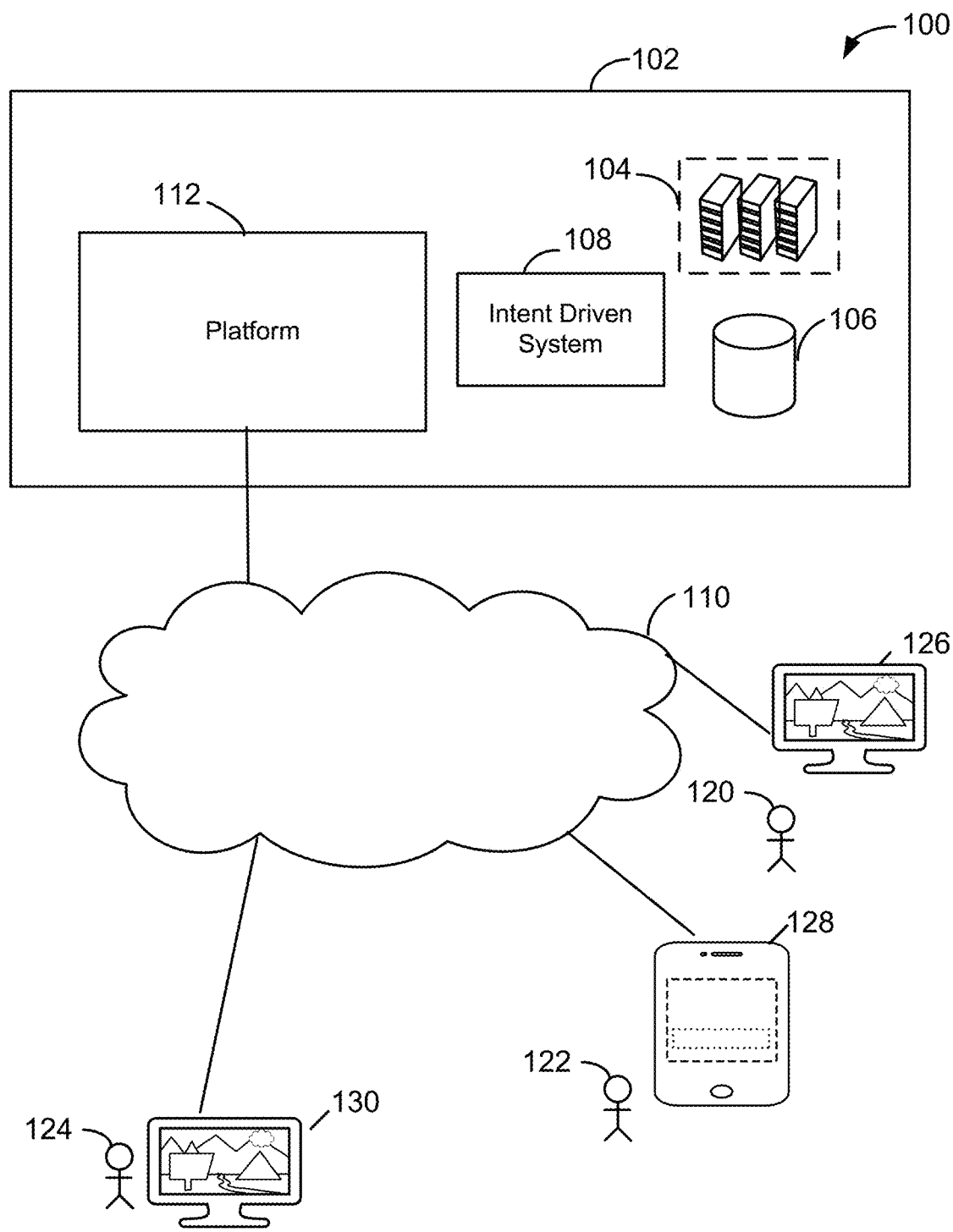
FIG. 1 shows a system diagram of an example of a system 100 in which a customizable intent driven system can be implemented, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured to implement a customizable intent driven system. In some implementations, systems, apparatus, methods, and computer program products are configured to execute actions in association with corresponding intents detected in requests according to user account specific settings.

In today's work environments, a user is often tasked with interacting with many software tools (e.g., applications) on a regular basis. These tools can include, but are not limited to, a calendar, electronic meeting applications, electronic messaging services, electronic mail, online document collaboration tools, etc.

In many instances, a user may have a difficult time locating the information they are seeking. Moreover, in the event that the information the user is seeking is located on multiple tools, information location and retrieval can be a time-consuming endeavor.

It is often necessary for a user to interact with several tools to accomplish a particular goal. Moreover, a change that occurs in one tool may dictate that an action be performed on another tool. Therefore, it can be difficult for a user to accomplish an objective that requires interaction with and coherence among multiple software tools.

As one example, to schedule a meeting, a user must typically send a meeting invite via an application such as a calendar application or meeting application. In addition, the user may wish to notify others that they will be unavailable during the meeting. Such a notification can include modifying a status of the user within a calendar application to "unavailable" or sending a message, indicating that the user will be unavailable, via a messaging application. When the meeting has ended, the user is then tasked with notifying others that they are now available (e.g., by changing the status of the user within a calendar application or sending a subsequent message via a messaging application). Therefore, a user's intent to schedule a meeting may require interaction with a number of different tools.

In accordance with various implementations, a customizable intent driven application triggering system provides a mechanism via which a user can customize those actions that are to be executed for a given intent. More particularly, for a given intent, the user may select from a predefined list of actions, those actions that are to be executed in the event that the user (or other entity acting on the user's behalf) subsequently expresses the intent in a request submitted to the system. The system updates the user account specific settings to indicate those actions that have been selected or "activated" for the intent in association with the user account.

In addition, the system provides mechanism(s) via which a user can submit a request that expresses their intent. The intent may be expressed via submission of text or other input via one or more user interface elements of a graphical user interface (GUI). In some implementations, the system may provide widget(s) that enable the user to query various types of information from the system. A widget may fetch information in a "passive" manner for various types of intents. More particularly, when a user accesses a web page containing one or more widgets, the widgets may fetch information without any additional explicit action from the user. For example, a widget may fetch and display the number of unread messages across messaging systems. Alternatively, the intent may be expressed via a verbal command submitted via a microphone and detected via a chatbot.

In some implementations, the system analyzes a user's request or a request submitted on behalf of the user, which can include text or audio input. More particularly, the system may implement natural language processing (NLP), pattern recognition, machine learning, and/or artificial intelligence to detect a user's intent within the request.

Upon detection of a particular intent in the request, the system executes those actions that have been activated for the intent in association with the user account. For a given action, execution can include transmission of a request via an application programming interface (API) of a corresponding application. Execution of an action can include transmission of value(s) via argument(s) of the API.

FIG. 1 shows a system diagram of an example of a system 100 in which a customizable intent driven system can be implemented, in accordance with some implementations. Database system 102 includes a variety of different hardware and/or software components that are in communication with each other. In the non-limiting example of FIG. 1, system 102 includes any number of computing devices such as servers 104. Servers 104 can include one or more web servers configurable to execute web applications. Servers 104 are in communication with one or more storage mediums 106 configured to store and maintain relevant data and/or metadata used to perform some of the techniques disclosed herein, as well as to store and maintain relevant data and/or metadata generated by the techniques disclosed herein. Storage mediums 106 may further store computer-readable instructions configured to perform some of the techniques described herein. Storage mediums 106 can also store user accounts/user profiles of users of system 100, as well as database records such as customer relationship management (CRM) records.

System 102 includes intent driven system 108, as described herein. More particularly, intent driven system 108 supports the customization of user account intent configurations, as well as the automated execution of actions in relation to intents detected in user-submitted requests according to the user account intent configurations.

In some implementations, system 102 is configured to store user profiles/user accounts associated with users of system 102. Information maintained in a user profile of a user can include a client identifier such an Internet Protocol (IP) address or Media Access Control (MAC) address. In addition, the information can include a unique user identifier such as an alpha-numerical identifier, the user's name, a user email address, and credentials of the user. Credentials of the user can include a username and password. The information can further include job related information such as a job title, role, group, department, organization, and/or experience level, as well as any associated permissions. Profile information such as job related information and any associated permissions can be applied by system 102 to manage access to web applications or services such as those described herein.

In addition, user profiles/user accounts can include configurations established, as described herein. Such configurations can include, but are not limited to, communication channel preferences and/or intent configurations.

Client devices 126, 128, 130 may be in communication with system 102 via network 110. More particularly, client devices 126, 128, 130 may communicate with servers 104 via network 110. For example, network 110 can be the Internet. In another example, network 110 comprises one or more local area networks (LAN) in communication with one or more wide area networks (WAN) such as the Internet.

Embodiments described herein are often implemented in a cloud computing environment, in which network 110, servers 104, and possible additional apparatus and systems such as multi-tenant databases may all be considered part of the "cloud." Servers 104 may be associated with a network domain, such as www.salesforce.com and may be controlled by a data provider associated with the network domain. In this example, employee users 120, 122, 124 of client computing devices 126, 128, 130 have accounts at salesforce.com®. By logging into their accounts, users 126, 128, 130 can access the various services and data provided by system 102 to employees. In other implementations, users 120, 122, 124 need not be employees of salesforce.com® or log into accounts to access services and data provided by system 102. Examples of devices used by users include, but are not limited to, a desktop computer or portable electronic device such as a smartphone, a tablet, a laptop, a wearable device such as Google Glass®, another optical head-mounted display (OHMD) device, a smart watch, etc.

In some implementations, users 120, 122, 124 of client devices 126, 128, 130 can access services provided by system 102 via platform 112 or an application installed on client devices 126, 128, 130. More particularly, client devices 126, 128, 130 can log into system 102 via an application programming interface (API) or via a graphical user interface (GUI) using credentials of corresponding users 120, 122, 124 respectively. Client devices 126, 128, 130 can communicate with system 102 via platform 112. Communications between client devices 126, 128, 130 and system 102 can be initiated by a user 120, 122, 124. Alternatively, communications can be initiated by system 102 and/or application(s) installed on client devices 126, 128, 130. Therefore, communications between client devices 126, 128, 130 and system 102 can be initiated automatically or responsive to a user request.

A web application executing via system 102 can implement intent driven system 108 to obtain user account intent configurations, detect intents in user-submitted requests, and perform automated execution of actions in relation to detected intents according to the user account intent configurations. Client devices 126, 128, 130 can access the web application via platform 112.

Some implementations may be described in the general context of computing system executable instructions, such as program modules, being executed by a computer. The disclosed implementations may further include objects, data structures, and/or metadata, which may facilitate the implementation of an intent driven system, as described herein.

Some implementations may also be practiced in distributed computing environments where tasks are performed by remote processing devices that are linked through a communications network. In a distributed computing environment, program modules may be located in local and/or remote computer storage media including memory storage devices.

Figure 2:
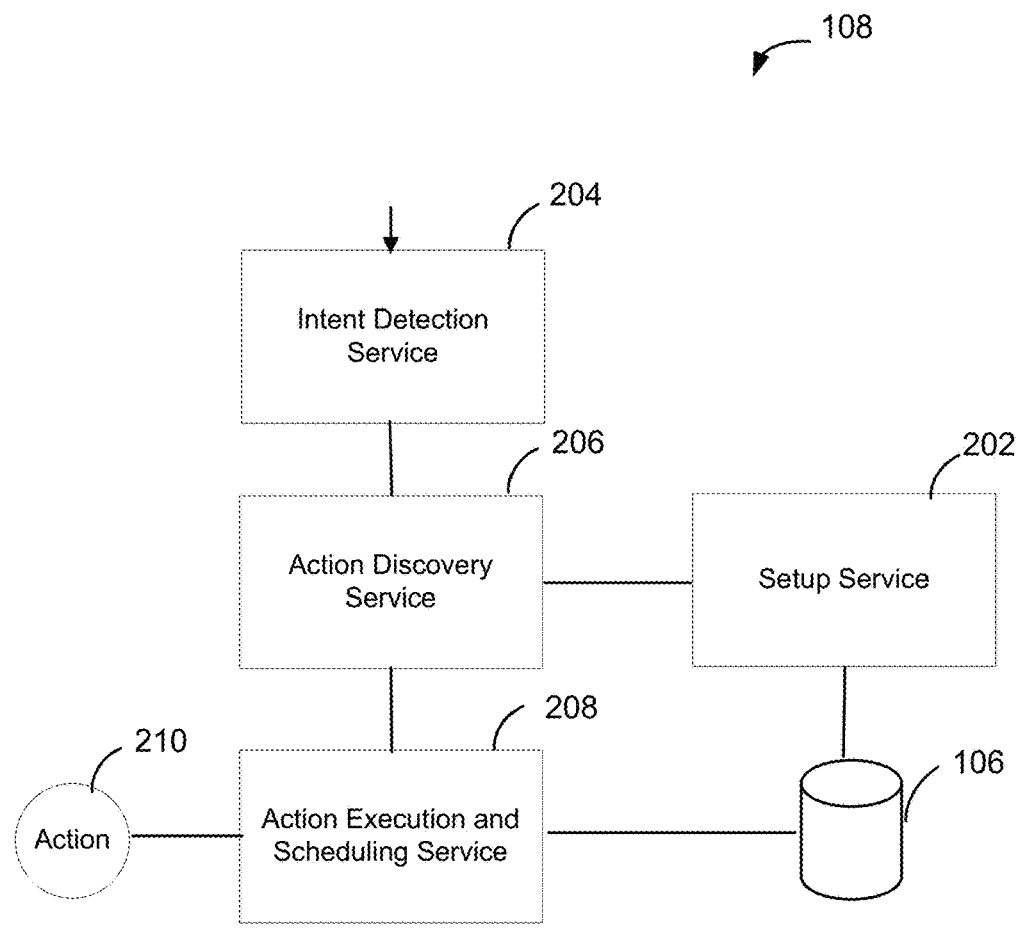
FIG. 2 shows a diagram of an example intent driven system 108, in accordance with some implementations.

FIG. 2 shows a diagram of an example intent driven system 108, in accordance with some implementations. In this example, intent driven system 108 includes a setup service 202 configurable to obtain and update user account specific settings such as intent configuration settings that indicate for a given user account, for each of one or more intents, a corresponding set of actions to be executed upon detection of the intent in a user-submitted request. In addition, user account specific settings can also indicate a preferred communication channel via which messages such as those indicating user availability/unavailability are to be transmitted for a user account. User account specific settings may be stored in storage mediums 106.

Intent detection service 204 is configurable to detect specific intent(s) within a request submitted by or on behalf of a user. The user request can be submitted via interaction with user interface element(s) of a GUI. Alternatively, the user request can include a verbal command. Intent detection service 204 may analyze the user request to detect the intent of the user. Analysis can include application of pattern detection, machine learning, artificial intelligence, and/or other suitable mechanisms.

In some implementations, a user may specify keywords that they wish to associate with a particular intent. These keywords may subsequently be used by the system to detect the user's intent.

In some implementations, a machine learning model is trained using a set of training data associated with the user or a set of users. The machine learning model may include a plurality of variables, where each variable has an associated weighting parameter. Each variable may be associated with a corresponding attribute. An attribute may be associated with the user. For example, attributes associated with the user can include, but are not limited to, a user identifier, job title, organization, and/or group within the organization.

In some implementations, a verbal command is converted to text and intent detection service 204 parses the text to obtain tokens that are processed to identify the most probable intent. Intent detection service 204 can confirm that the identified intent is the one intended by the user prior to proceeding with execution of actions associated with the intent. In the event that the identified intent is not intended by the user, the system may request further input by the user or suggest an alternate intent that is likely to be intended by the user.

In some implementations, a user-submitted request can include value(s) that are pertinent to execution of an action associated with an intent detected in the request. For example, if the user intends to schedule a meeting, the value(s) can include a date, time, and/or identities of pertinent individuals or groups that are to receive a meeting invite.

Action discovery service 206 is configurable to identify, for a detected intent, those actions that are to be executed in relation to the intent for a specific user account. In some implementations, action discovery service 206 communicates with setup service 202 to ascertain user account specific settings such as intent configuration settings. In other implementations, action discovery service 206 independently queries storage mediums 106 to ascertain user account specific settings.

Once user account specific settings such as intent configuration settings for a given user account are ascertained, actions that the user has "activated" in association with the detected intent may be executed and/or scheduled for subsequent execution. Action execution and scheduling service 206 is configurable to execute action(s) 210 that the user has chosen to activate in relation to the detected intent. In addition, action execution and scheduling service 206 is configurable to schedule any actions that are to be executed at a subsequent time. Such automatic scheduling may be performed according to a set of rules associated with the detected intent and/or associated action(s). In some instances, an action may automatically be scheduled to occur at a particular time (e.g., according to user-provided value(s)). In other instances, an action may automatically be scheduled to occur in response to satisfaction of a condition or upon completion of another action or associated event such as the end of a meeting. Therefore, for a given intent or action, a change in status of one application may trigger that an action be executed via another application.

In some implementations, an action is executed via an API corresponding to an application configured to execute the action. For example, to schedule a meeting, an API of a calendar application may be called to schedule the meeting via the calendar application. In some instances, the system may obtain value(s) from the user-submitted request and transmit the value(s) as argument(s) of an API. For example, the argument(s) can include a date, time, and/or identities of attendees of the meeting being scheduled.

Figure 3:
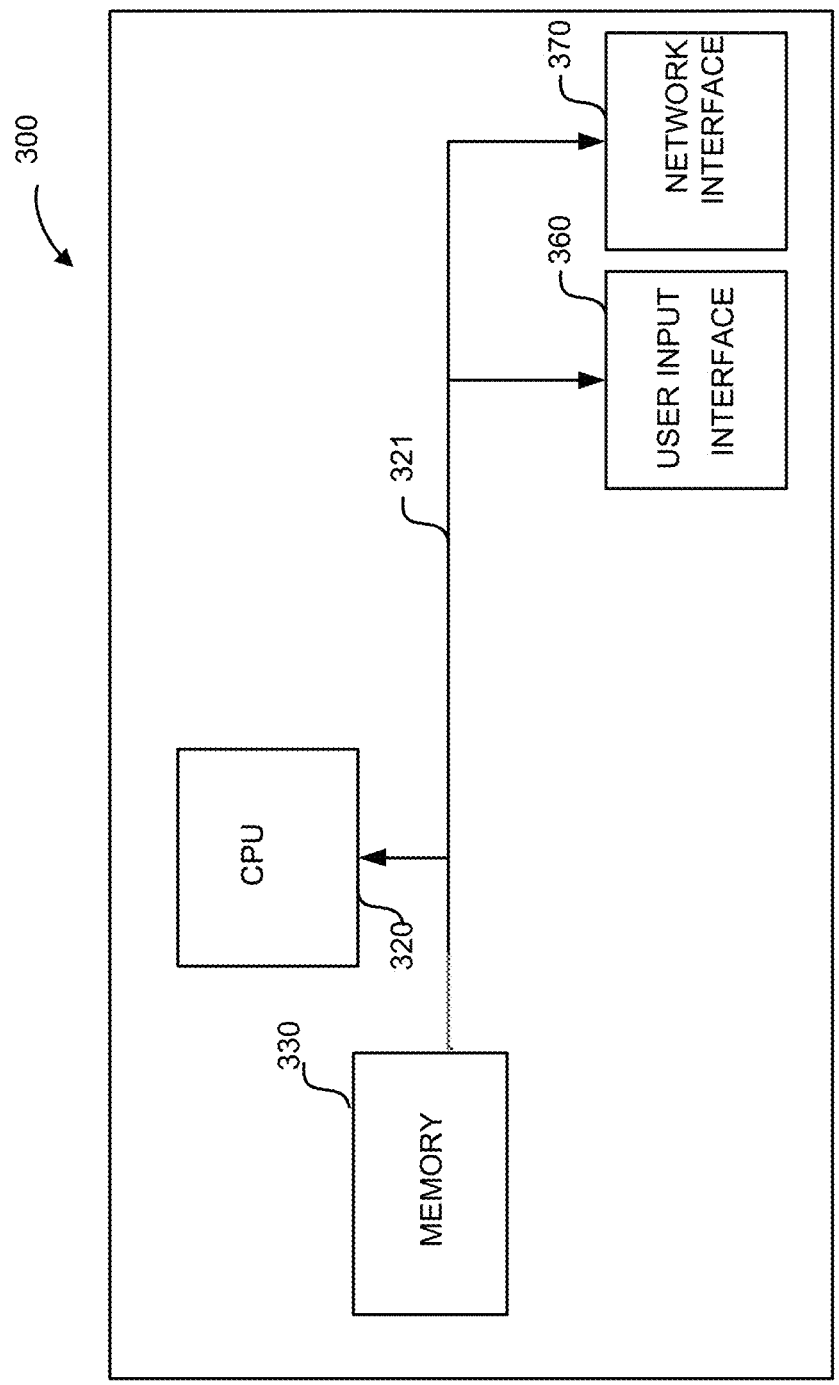
FIG. 3 is a diagram of an example computing system 300 that may be used with some implementations.

A computing device that operates as a server or client device may be implemented via any suitable computing system. FIG. 3 is a diagram of an example computing system 300 that may be used with some implementations. Computing system 300 may include a central processing unit (CPU) 320 having one or more processing cores and a memory 330. In addition, computing system 300 may include a system bus 321 that couples with various system components including the memory 330 and the CPU 320.

In some implementations, computing system 300 includes a variety of computer program products. A computer program product can be any available media that can be accessed by computing system 300 including, but not limited to, volatile and nonvolatile media, removable and non-removable media. A computer program product may store information such as computer readable instructions, data structures, or other data such as that described herein.

Memory 330 may include read only memory (ROM)) and/or random-access memory (RAM). In some implementations, memory 330 stores computer readable instructions, data structures, and/or data, which may be generated or processed as described herein.

In some implementations, a user may interact with the computing system 300 through an input device such as a keyboard, a microphone, a remote control, and/or a pointing device such as a mouse, touch pad, or touch screen. These and other input devices may be connected to the CPU 320 through a user input interface 360. Alternatively, an input device may be connected to computing system 300 by another interface such as a universal serial bus (USB) port or wireless interface.

Computing system 300 may operate in a networked environment via which it may connect to a system such as that described above with reference to FIG. 1. Computing system 300 may be connected to a local or wide area network through a network interface or adapter 370.

In some implementations, a user can configure user account specific settings in association with a user account. The user account specific settings can control the manner in which the intent driven system operates in relation to the user account.

FIG. 4A shows an example graphical user interface (GUI) 400 via which user preferences can be configured, in accordance with some implementations. In some implementations, user account specific settings can specify or otherwise indicate a messaging application or channel 402 via which the user prefers messages be transmitted by the system on the user's behalf. In some implementations, a channel is identified by a topic name. In this example, the topic includes a hashtag character that enables the topic to be searched by other users.

By specifying or otherwise indicating a preferred channel via a user interface element of GUI 400, the user can identify a virtual location or web page via which messages are to be posted by the system on behalf of the user.

In some implementations, a user can activate or deactivate a confirmation configuration 404. Confirmation configuration 404 can indicate whether the user would like the system to request confirmation of the user prior to taking any action on the user's behalf. For example, the system may confirm the user's intent prior to executing actions associated with the intent. As another example, the system may ask the user to confirm that they would like the system to proceed with executing a particular action (e.g., posting a message, scheduling a meeting) on the user's behalf.

As described above, user account specific settings can include intent configurations. In accordance with various implementations, the system supports a plurality of intents that can be detected by the system within user submitted requests. Each intent has a corresponding list of one or more actions that are available for selection by a user of the system. For a given intent, the user can choose to activate those actions he or she would like the system to execute upon detecting the intent in a request submitted in association with the user account. Similarly, a user can choose to deactivate those actions that he or she would not like the system to execute upon detecting the intent in a request submitted in association with the user account.

As will be described in further detail below, a user may authorize actions to be executed by the system on their behalf. In some implementations, a user may authorize an action to be executed by a colleague or other individual on the user's behalf. Therefore, actions may be taken on behalf of the user while respecting the user's intent configurations, as well as authorization properties (e.g., indicating those individuals authorized to execute an action on behalf of the user).

Figure 4B:
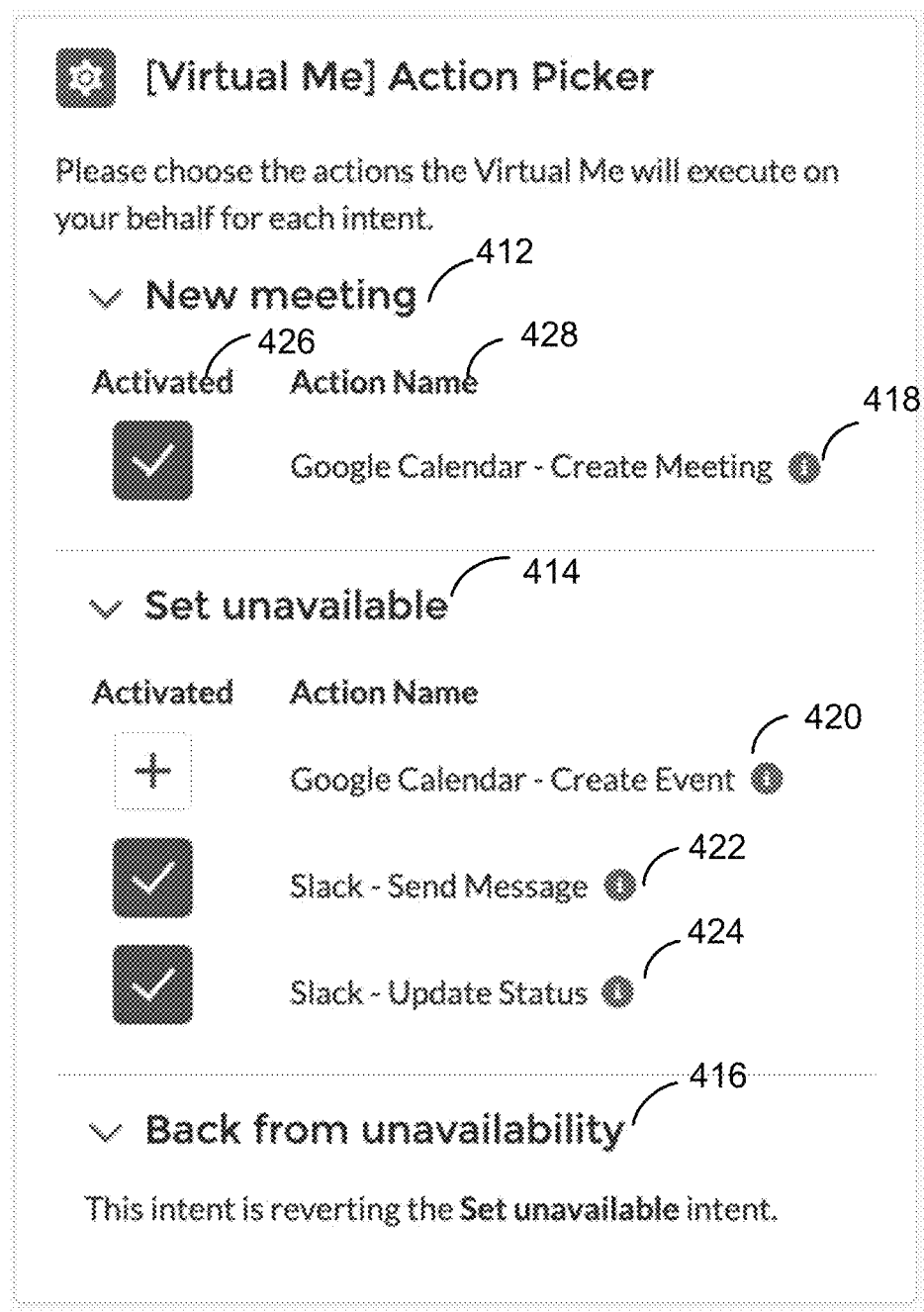
FIG. 4B shows an example GUI 410 via which actions can be activated for a given intent, in accordance with some implementations.

FIG. 4B shows an example GUI 410 via which actions can be activated for a given intent, in accordance with some implementations. In this example, GUI 410 presents user-configurable intents including New meeting 412 indicating an intent to create a new meeting, Set unavailable 414 indicating an intent to set the status of a user to unavailable, and Back from unavailability 416 indicating an intent to revert the status of the user to available. For each intent, corresponding action(s) are presented. More particularly, in this example, for the intent New meeting 412, a corresponding action Google Calendar—Create meeting 418 is presented. In addition, for the intent Set unavailable 414, actions presented include Google Calendar—Create Event 420, Slack—Send Message 422, and Slack—Update Status 424. For the intent Back from unavailability 416, a corresponding list of actions may be presented.

For each user-configurable action, a user-selectable option is configurable to indicate whether the action is activated for the corresponding intent in association with the user account. In this example, user interface element 426 is user-selectable such that an action identified by a corresponding action name 428 is activated when user interface element 426 is in a first state and deactivated when user interface element 426 is in a second state. In other words, w % ben an action is activated, it is executed in response to detection of the corresponding intent in a user submitted request. However, when an action is not activated, the action is not executed in response to detection of the corresponding intent in a user submitted request.

In this example, user interface element 426 is designated by a "+" symbol. When an action is not activated, user interface element 426 remains unchanged. However, when the action is activated, user interface element 426 is designated by a check mark symbol. In this manner, the state of activation of a given action in relation to a particular intent may be designated by a visual indicator within GUI 410. As shown in FIG. 4B, a user associated with the user account has elected to activate the Slack-Send Message action 422 and Slack-Update Status action 424 in association with the Set unavailable intent 414. However, the user has not activated the Google Calendar—Create Event action 420 in association with the Set unavailable intent 414. Thus, in this example, when the Set unavailable intent 414 is detected in a request received in association with the user account (e.g., from the user), Slack-Send Message 422 and Slack-Update Status 424 actions are executed but Google Calendar-Create Event action 420 is not executed. Therefore, a user can select those applications that they would like to perform actions on their behalf in association with a particular intent.

In some implementations, action(s) corresponding to a particular intent cannot be activated or deactivated by a user. In some implementations, a system administrator can control which actions can be activated and deactivated by users of the system.

In some implementations, intents supported by the system are configurable by a system administrator. In addition, for a given intent, an administrator may configure a corresponding list of actions. More particularly, an administrator can associate an API of an application with a corresponding action, enabling the action to be executed via a corresponding application by calling the API. For example, the API may be associated with a particular electronic mail system supported by an organization. Therefore, the system is customizable to support a variety of intents, applications, and actions.

Figure 4C:
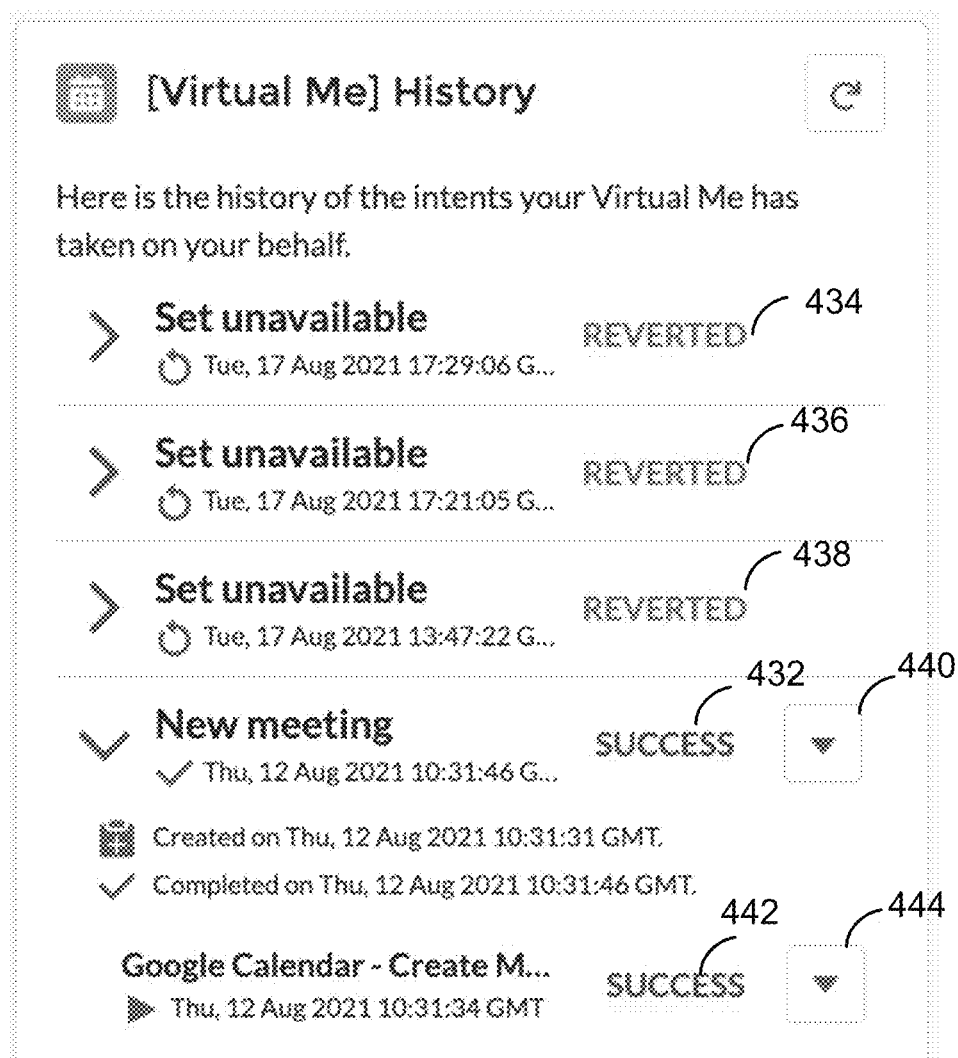
FIG. 4C shows an example GUI 430 via which historical data pertaining to intents can be accessed, in accordance with some implementations.

In some implementations, a user can view historical data pertaining to intents and associated actions. FIG. 4C shows an example GUI 430 via which historical data pertaining to intents can be accessed, in accordance with some implementations. More particularly, a user can access GUI 430 to view a history of intents for which actions have been scheduled, for which actions have been executed by the system on the user's behalf, or for which attempts to execute action(s) were performed by the system on the user's behalf.

Within the history, a visual status indicator may be provided for a corresponding intent. Similarly, a visual status indicator may be provided for a corresponding action. Execution of an intent is accomplished via execution of all activated actions for the intent.

For example, a visual status indicator may indicate one or more of: the corresponding intent or action has been executed successfully, that execution of the corresponding intent or action has failed, that execution of the intent or action has been scheduled, that execution of the intent or action has been cancelled, that the intent or action is currently running, or that execution of the intent or action has been reverted (e.g., reversed).

In some implementations, the system determines the status of an intent based on the statuses of activated actions of the intent. For example, if the execution of an activated action of the intent fails, the status of the intent is set to indicate that execution of the intent has failed. As another example, if one or more activated actions of the intent complete execution successfully (and there has been no failed execution of activated action(s) of the intent), the status of the intent can be set to indicate that execution of the intent was successful. As yet another example, the status of the intent can be set to successful if all activated actions of the intent have successfully executed.

As shown in this example, for a given intent, a "SUCCESS" indicator notifies the user that actions taken in association with the intent have been successfully completed. Specifically, as shown at 432, "SUCCESS" indicator indicates that actions taken in relation to New meeting intent 412 were successfully executed. Similarly, as shown at 442, for a given action, a "SUCCESS" indicator notifies the user that the corresponding action executed by the system on the user's behalf has been successfully completed. In addition, a timestamp indicating a time that action(s) were executed may be displayed in relation to the corresponding intent.

Once action(s) have been executed for an intent, those actions may subsequently be "reverted." In other words, actions taken may be reversed to "undo" those actions. Such reversion may be denoted by a "REVERTED" indicator, as shown at 434, 436, 438. Reversion may be performed automatically by the system or responsive to a user request. Specifically, automatic reversion may be performed according to intent configurations. Alternatively, a user may elect to revert action(s) taken in association with an intent by submitting a request to revert the actions.

In this example, a user may select a user interface element such as user interface element 440 to revert all actions that have been successfully completed in association with a corresponding intent. Upon selection of user interface element 440, the system automatically reverses the corresponding actions that were previously taken and the reversion will be denoted by a corresponding "REVERTED" indicator, as discussed above.

Figure 4D:
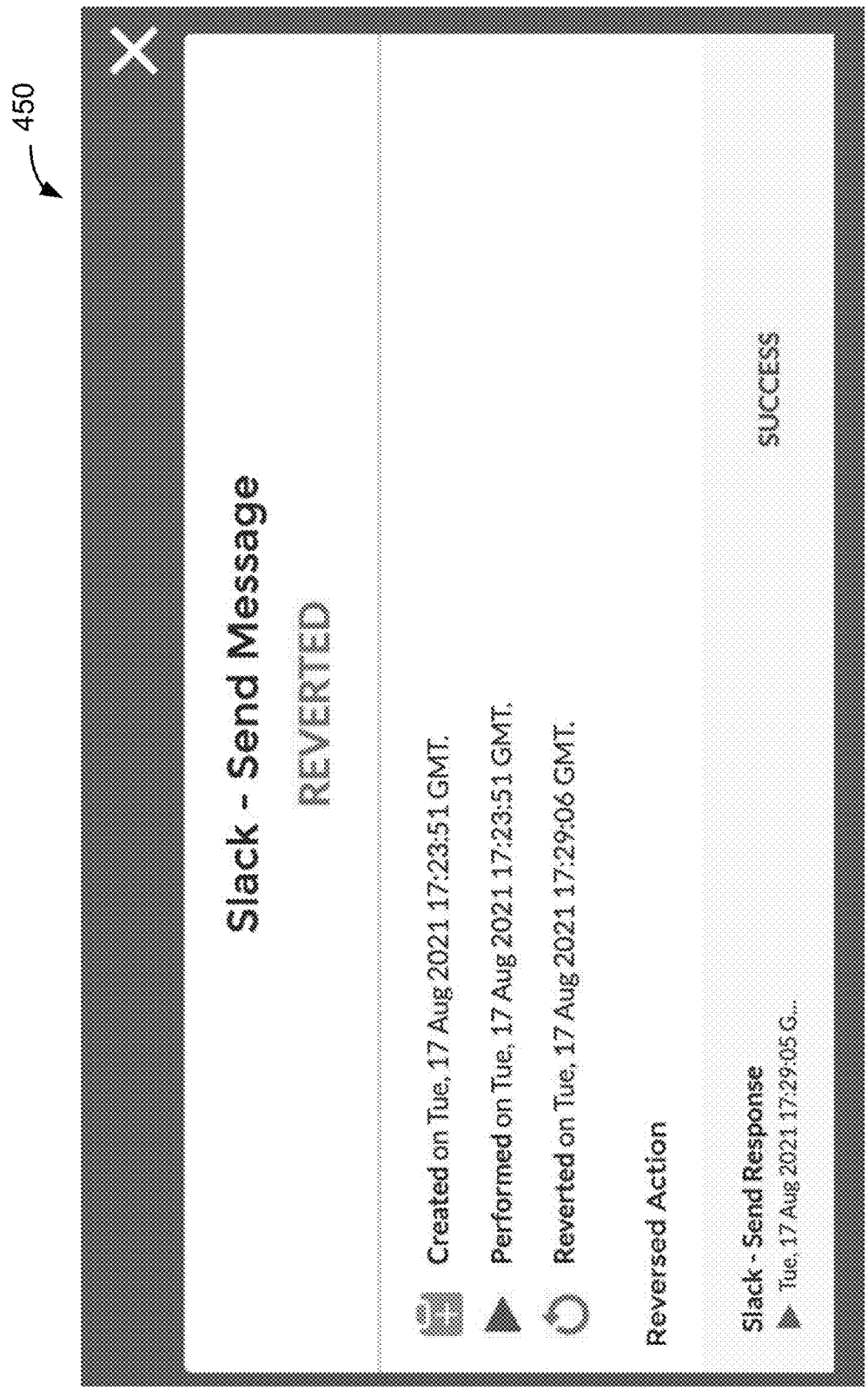
FIG. 4D shows an example GUI 450 via which a status of messages transmitted by the intent driven system can be accessed, in accordance with some implementations.

In addition, a user may select a user interface element such as user interface element 444 to revert a corresponding action taken in association with a single intent. The reversion will be denoted by a corresponding "REVERTED" indicator. A user may also view historical data pertaining to specific actions executed on behalf of the user. FIG. 4D shows an example GUI 450 via which a status of messages transmitted by the intent driven system can be accessed, in accordance with some implementations. As shown in this example, the Slack Send Message action was created (e.g., activated by the user in association with the user account), performed (e.g., executed via an API of a corresponding messaging application), and reverted at times indicated by corresponding timestamps.

In accordance with various implementations, reversion of an action or all actions taken in association with an intent, is accomplished via execution of a corresponding set of reversion actions. The set of reversion actions for an action or intent can be statically or dynamically configured. For example, a software developer can generate computer-readable code configurable to execute a particular set of reversion actions in response to selection of a corresponding user interface element by a user. As another example, an administrator can configure the set of reversion actions for a particular action or intent via interaction with a corresponding GUI.

With respect to the example shown in FIG. 4D, reversion of the sending of a message can include the execution of one or more reversion actions such as removal of the message, deleting the message, updating the message, or posting of a new message that contains content that is opposite that previously posted. For example, for the intent "Set unavailable," to perform the Slack Send Message action, a message indicating that the user is unavailable is posted via the Slack application (e.g., at the start time of a meeting). To revert this action, a message indicating that the user is available may be posted via the Slack application (e.g., after a scheduled meeting is completed).

In the above example, a single action is reverted. However, it is important to note that this example is merely illustrative. Thus, a user can revert one or more actions taken in association with a particular intent.

Figure 4E:
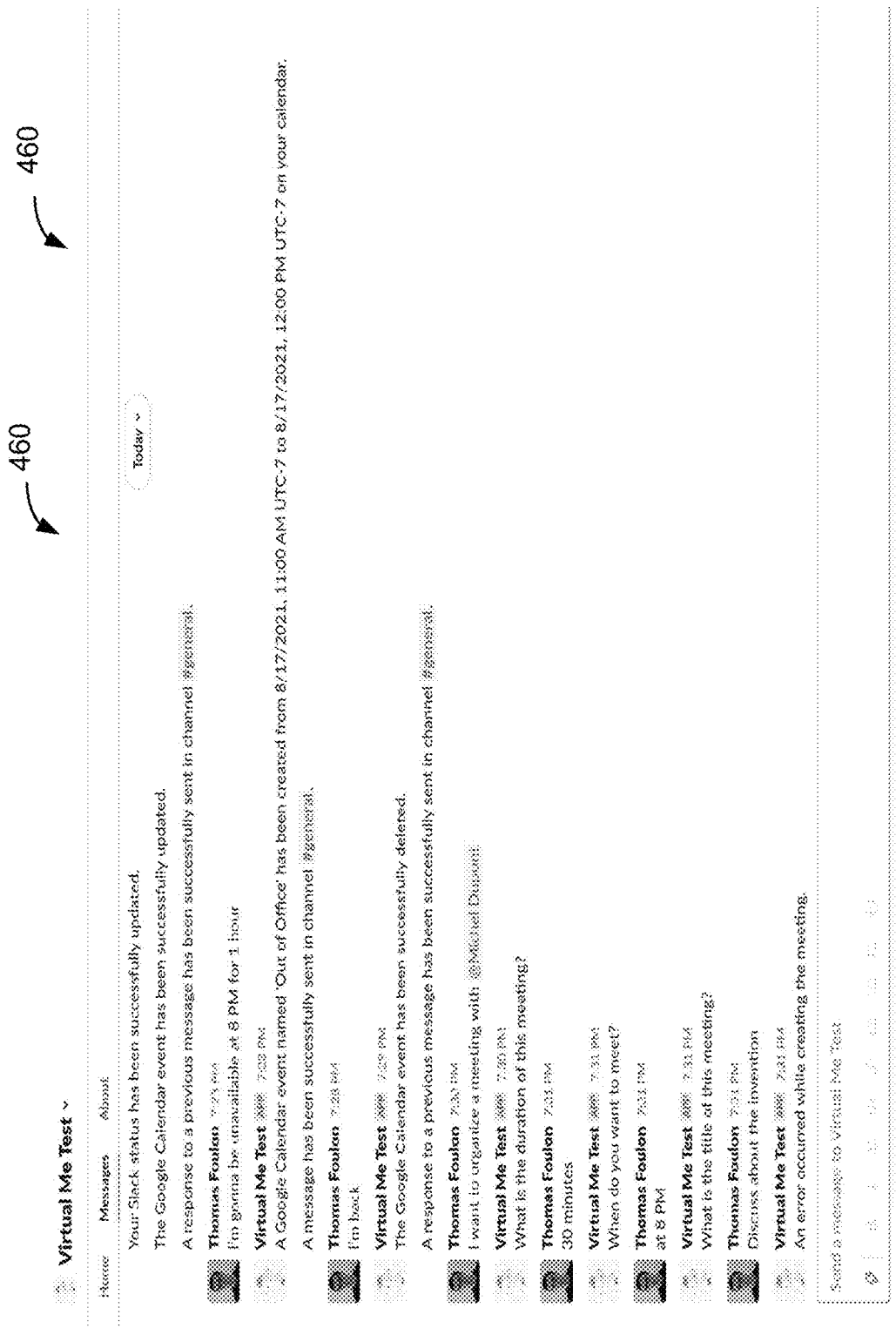
FIG. 4E shows an example interaction 460 between a user and the intent driven system, in accordance with some implementations.

FIG. 4E shows an example of interaction 460 between a user and the intent driven system, in accordance with some implementations. As shown in this example, in a request submitted by the user, the user tells the system he will be unavailable for a period of time. The system detects a "Set unavailable" intent in the request and executes a Google Calendar—Create Event action to create an out of office event for the specified period of time. When the user tells the system he is "back," the system detects a "Back from unavailability" intent responsive to which the system reverts the previously performed actions.

In addition, the user tells the system that they want to organize a meeting of a specified duration. The system may prompt the user for information that is not provided such as the time at which the user wishes to hold the meeting. Responsive to detecting the "New meeting" intent, the system may create a meeting by executing the corresponding action by calling an API of the Google Calendar application.

Figure 5:
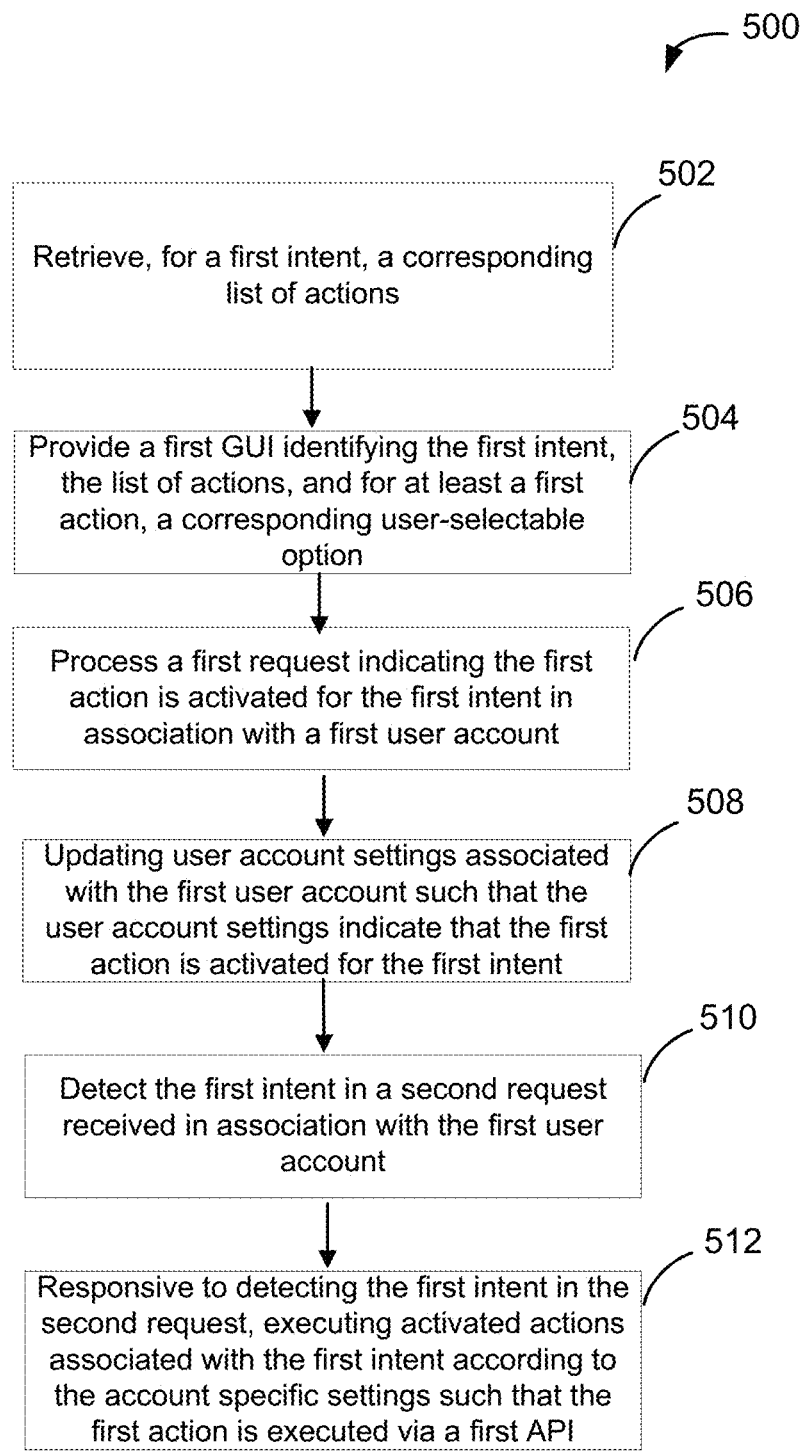
FIG. 5 shows a process flow diagram illustrating a method of implementing an intent driven system, in accordance with various implementations.

FIG. 5 shows a process flow diagram 500 illustrating a method of implementing an intent driven system, in accordance with various implementations. First, the system facilitates configuration of intents for a user account. In some implementations, the system identifies a set of intents that is available to the user account and, for each intent in the set of intents, a corresponding list of actions available to the user account. The set of intents that is available to a particular user account or set of user accounts may be configurable via a system administrator. Similarly, the list of actions available for a given intent to a particular user account or set of user accounts may be configurable via a system administrator.

As shown in FIG. 5, the system retrieves, for at least a first intent in a plurality of intents associated with the system, a corresponding list of actions at 502. A first action in the list of actions may be associated with a first application programming interface (API) of a first application. The system provides at 504, to a first client device associated with a first user account, a first graphical user interface (GUI) identifying the first intent, the list of actions, and for at least the first action in the list of actions, a corresponding user-selectable option configurable to indicate whether the first action is activated for the first intent in association with the first user account. The system processes a first request received from the first client device in association with the user-selectable option at 506, where the first request indicates that the first action is activated for the first intent in association with the first user account. Responsive to processing the first request, the system updates at 508, in association with the first user account, user account specific settings such that the user account specific settings indicate that the first action is activated for the first intent. The system may similarly update the user account specific settings to reflect actions that are activated or deactivated by the user for other intents supported by the system, as described herein.

The system detects the first intent in a second request received in association with the first user account at 510. More particularly, a user associated with the first user account may submit the second request via interaction with a chat bot, a widget, or other input mechanism. For example, the user may tell the chat bot, "I will be unavailable for one hour this afternoon." The system may detect the first intent via application of a machine learning algorithm, pattern recognition, or artificial intelligence to the second request. In some implementations, the system may translate a voice command to text. In addition, the system may parse the text and/or perform natural language processing on the text prior to detection of the first intent. For example, the system may parse the second request to obtain one or more tokens or values.

If the user submits the second request via interaction with a widget rendered via a web page, the system may call an API corresponding to the widget. For example, the API may be called with one or more values from one or more fields of the web page.

Responsive to detecting the first intent in the second request, the system executes activated actions associated with the first intent according to the user account specific settings stored in association with the first user account at 512. For example, the first action may be executed by calling the first API. In some implementations, the system identifies the activated actions associated with the first intent by querying the user account specific settings in a database. In other implementations, the system identifies the activated actions associated with the first intent by querying a setup service. In this manner, the system may ascertain the activated actions in relation to a particular intent for a particular user account.

In some instances, at least one of the activated actions is scheduled responsive to detecting the first intent. Scheduling an action may include scheduling the action to be performed at a particular time and/or date. Alternatively, scheduling an action may include scheduling the action to be performed responsive to occurrence of a particular condition. For example, the reverting of an unavailable action may be automatically scheduled to occur responsive to the ending of a meeting that was scheduled in association with a scheduled meeting intent. Therefore, execution of actions may occur immediately responsive to detection of an intent and/or at a later time, as scheduled by the system.

Scheduling of an action can be performed based, at least in part, one or more tokens or values obtained from the second request, a set of rules associated with one or more of the activated actions, or a set of rules associated with the intent. For example, a set of rules indicating a relationship between two or more of the actions may be associated with one or more of the activated actions or the intent.

Scheduling of an action may include the storing of information in a database that is accessed by Action Execution and Scheduling Service 208. In some instances, scheduling of an action can include calling an API of a corresponding application. For example, a meeting can be scheduled by calling an API of a meeting application.

In some implementations, a user can cancel a scheduled action. For example, a voice command containing the phrase "cancel meeting" can cause a scheduled meeting to be canceled. The cancellation can be implemented, for example, via a cancel action. Alternatively, the cancellation can be implemented via a set of reversion actions associated with the intent.

The system may call the first API with argument(s) of the first API including one or more tokens or value(s) of the second request. For example, the value(s) can include a meeting date, time, and/or invitee(s). As another example, the value(s) can identify information the user seeks to retrieve.

The actions that can be executed for a particular intent can include one or more actions. Examples of actions include, but are not limited to, scheduling a meeting, notifying individuals that the user is unavailable, posting a message, and performing a set of database operations (e.g., querying). In the event that an action includes posting a message, the message may be posted via a channel configured in the user account specific settings.

For example, the system may ascertain from the second request that the user is requesting information pertaining to a customer account. In response, the system may query one or more databases to retrieve information requested by the user. In some implementations, the system may ascertain the appropriate databases to query based on the content of the second request.

Information that is queried can include customer relationship management (CRM) records, data maintained by an application such as an electronic mail application, information pertaining to the user, and/or information pertaining to colleagues of the user. For example, the user may wish to know how many unread messages they have among all of the messaging applications they are using. As another example, the user may wish to know how much time there is remaining before the next scheduled meeting.

In the event that the user has not activated any actions for a given intent, the system does not execute any actions for the detected intent. Thus, by choosing not to activate any actions for a particular intent, the user may choose to "deactivate" that intent for their user account.

In some implementations, where the user has submitted a confirmation configuration, the system may request confirmation of the user's intent prior to executing action(s) on behalf of the user. Alternatively, the system may request confirmation that the user would like the system to perform a particular action on behalf of the user. A confirmation configuration may be applicable to all actions activated by the user or, alternatively, may be specific to a particular intent or action. Confirmation may be requested via text, email, a messaging application, or another suitable mechanism.

A user's response to a confirmation request may be obtained and used to update a machine learning model. For example, if the user indicates that the intent identified by the system is incorrect, this may be used to refine the machine learning model so that it more accurately identifies the user's intent in the future.

The disclosed implementations support the customization of an intent driven system by companies and individual users. The customization may easily be performed through interaction with user interfaces. Therefore, customization of the intent driven system may be achieved by non-technical users with minimal effort.

Some but not all of the techniques described or referenced herein are implemented using or in conjunction with a database system. Salesforce.com, inc. is a provider of customer relationship management (CRM) services and other database management services, which can be accessed and used in conjunction with the techniques disclosed herein in some implementations. In some but not all implementations, services can be provided in a cloud computing environment, for example, in the context of a multi-tenant database system. Thus, some of the disclosed techniques can be implemented without having to install software locally, that is, on computing devices of users interacting with services available through the cloud. Some of the disclosed techniques can be implemented via an application installed on computing devices of users.

Information stored in a database record can include various types of data including character-based data, audio data, image data, animated images, and/or video data. A database record can store one or more files, which can include text, presentations, documents, multimedia files, and the like. Data retrieved from a database can be presented via a computing device. For example, visual data can be displayed in a graphical user interface (GUI) on a display device such as the display of the computing device. In some but not all implementations, the disclosed methods, apparatus, systems, and computer program products may be configured or designed for use in a multi-tenant database environment.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 6A:
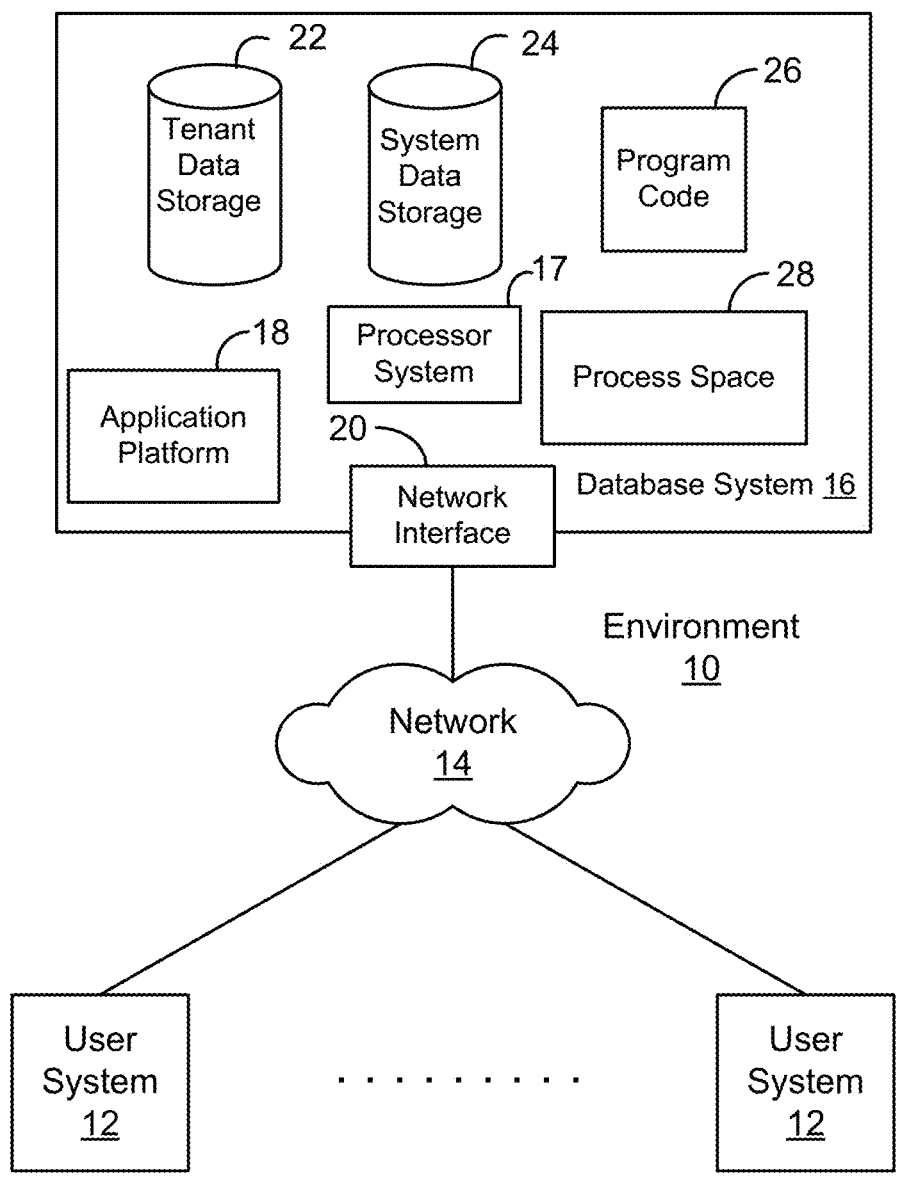
FIG. 6A shows a block diagram of an example of an environment 10 in which an on-demand database service can be used in accordance with some implementations.

FIG. 6A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 6A (and in more detail in FIG. 6B) user systems 12 might interact via a network 14 with an on-demand database service, which is implemented in the example of FIG. 6A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 6A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 7A:
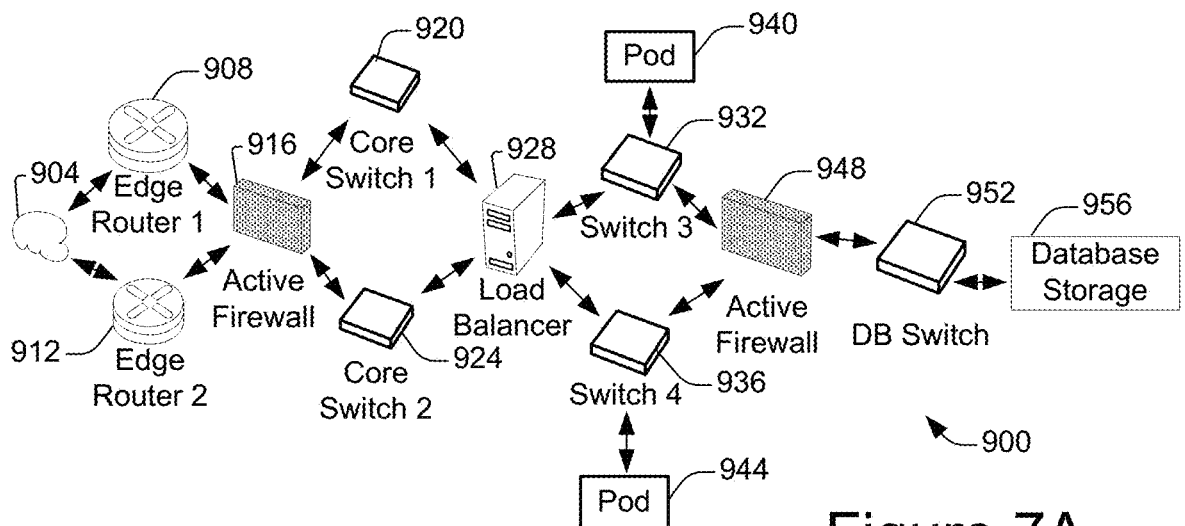
FIG. 7A shows a system diagram of an example of architectural components of an on-demand database service environment 900, in accordance with some implementations.
Figure 7B:
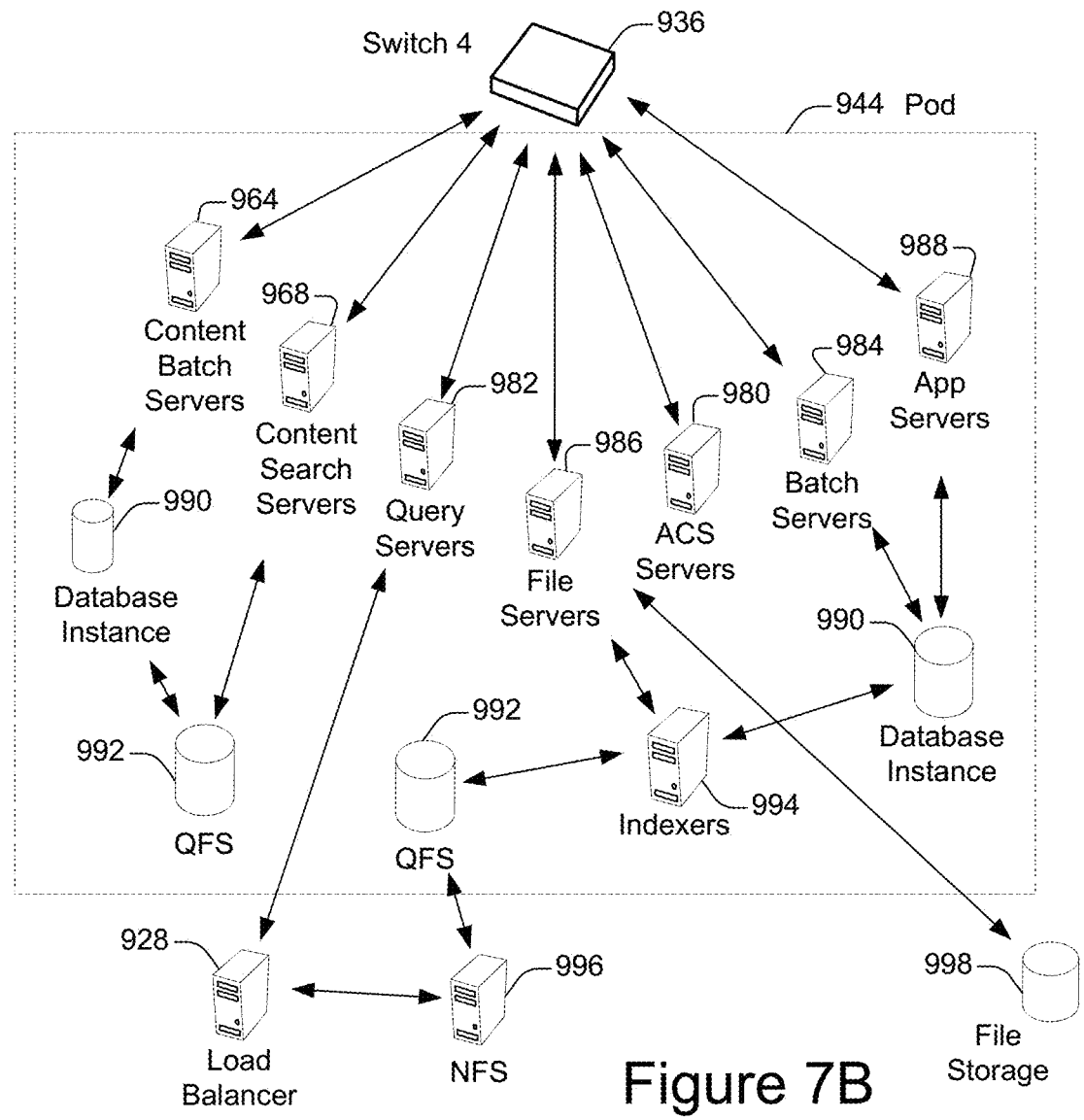
FIG. 7B shows a system diagram further illustrating an example of architectural components of an on-demand database service environment, in accordance with some implementations.

One arrangement for elements of system 16 is shown in FIGS. 7A and 7B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 6A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a 'computer'. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN. LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C. C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MIS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

Figure 6B:
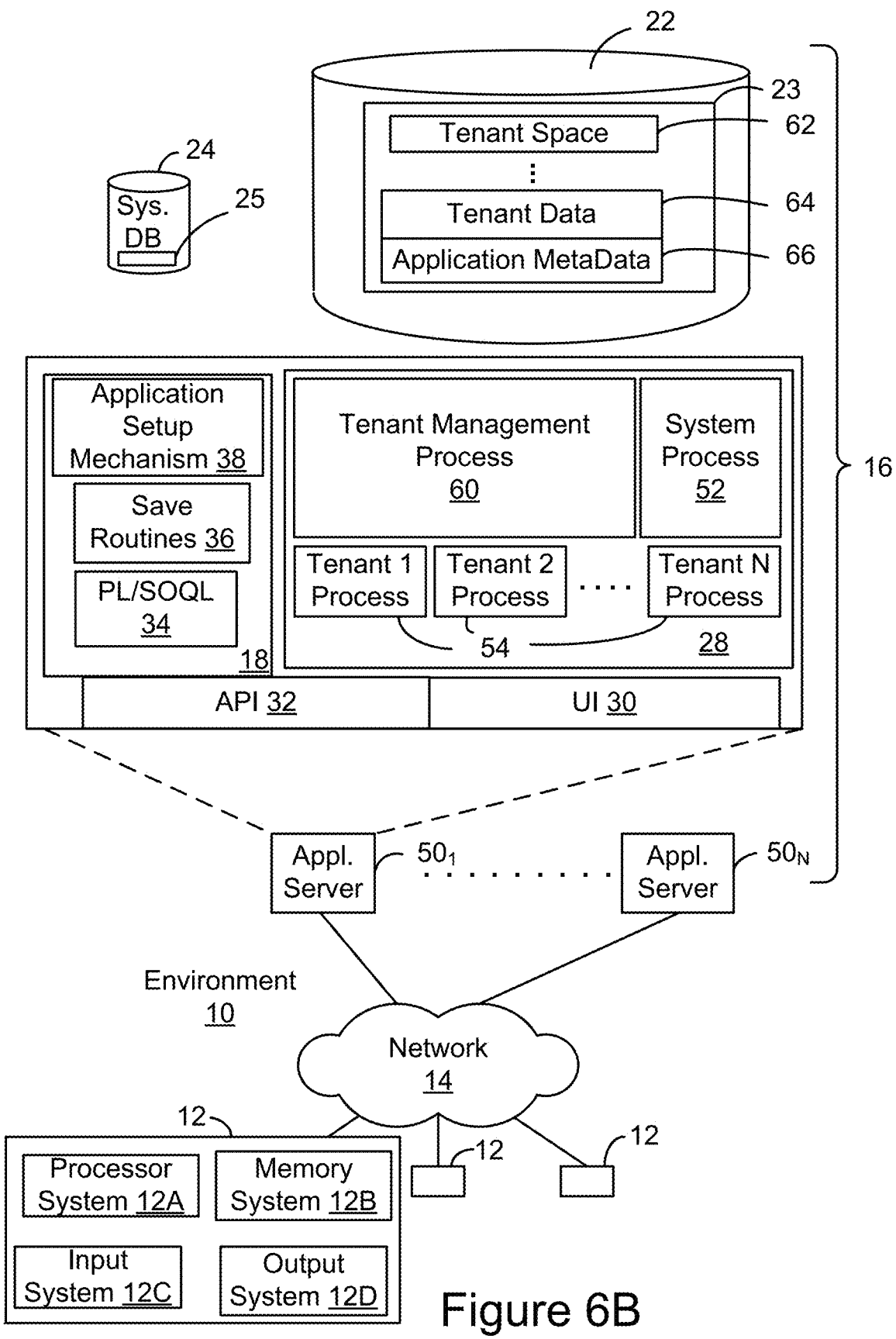
FIG. 6B shows a block diagram of an example of some implementations of elements of FIG. 6A and various possible interconnections between these elements.

FIG. 6B shows a block diagram of an example of some implementations of elements of FIG. 6A and various possible interconnections between these elements. That is, FIG. 6B also illustrates environment 10. However, in FIG. 6B elements of system 16 and various interconnections in some implementations are further illustrated. FIG. 6B shows that user system 12 may include processor system 12A, memory system 12B, input system 12C, and output system 12D. FIG. 6B shows network 14 and system 16. FIG. 6B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 6A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 6B, system 16 may include a network interface 20 (of FIG. 6A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems. e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 7A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

As shown in FIGS. 7A and 7B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 7A and 7B, some implementations of an on-demand database service environment may include anywhere from one to many devices of each type. Also, the on-demand database service environment need not include each device shown in FIGS. 7A and 7B, or may include additional devices not shown in FIGS. 7A and 7B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 7B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 7A and 7B.

FIG. 7B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 7A and 7B include a hardware and/or software framework configurable to execute procedures using programs, routines, scripts, etc. Thus, in some implementations, one or more of application servers $50_1$-$50_N$ of FIG. 7B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 7B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 6A, 6B, 7A and 7B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 7A and 7B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 6A, 6B, 7A and 7B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, Java. C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a database system implemented using a server system, the database system configurable to cause:
retrieving, for a first intent in a plurality of intents associated with the database system, a corresponding list of actions, a first action in the list of actions being associated with a first application programming interface (API) of a first application and a second action in the list of actions being associated with a second API of a second application;
providing, to a first client device associated with a first user account, a first graphical user interface (GUI) identifying the first intent, the list of actions, and for at least the first action in the list of actions, a corresponding user-selectable option configurable to indicate activation state of the first action for the first intent in association with the first user account;
processing a first request received from the first client device in association with the user-selectable option, the first request indicating that the first action is activated for the first intent in association with the first user account;
responsive to processing the first request, updating, in association with the first user account, user account specific settings such that the user account specific settings indicate that the first action is activated for the first intent;
processing a second request received in association with the first user account, the second request indicating activation state of the second action for the first intent in association with the first user account;
responsive to processing the second request, updating, in association with the first user account, the user account specific settings such that the user account specific settings indicate activation state of the second action for the first intent;
detecting the first intent in a third request received in association with the first user account;
parsing the third request such that one or more values are obtained;
and
responsive to detecting the first intent in the third request, executing activated actions associated with the first intent according to the user account specific settings stored in association with the first user account such that the first action is executed via the first API, wherein executing the activated actions includes calling the first API with one or more arguments including the one or more values.

2. The system of claim 1, the database system further configurable to cause:
the second request indicating that the second action is not activated for the first intent in association with the first user account;
wherein updating, in association with the first user account, the user account specific settings such that the user account specific settings indicate the activation state of the second action for the first intent includes updating the user account specific settings such that the user account specific settings indicate that the second action is not activated for the first intent;
wherein executing the activated actions does not include executing the second action via the second API.

3. The system of claim 1, the database system further configurable to cause:
executing a set of reversion actions associated with at least one of the activated actions or the first intent.

4. The system of claim 1, wherein executing the activated actions includes transmitting a message via the first API.

5. The system of claim 1, the database system further configurable to cause:
scheduling at least one of the activated actions to be performed at a particular time or responsive to occurrence of a particular condition, the scheduling being performed based, at least in part, on one or more of: one or more tokens or values of the third request, a set of rules associated with one or more of the activated actions, or a set of rules associated with the first intent.

6. The system of claim 1, the database system further configurable to cause:
generating a machine learning model using a set of training data;

wherein detecting the first intent includes applying the machine learning model to at least a portion of the third request.

7. A method, comprising:

retrieving, for a first intent in a plurality of intents associated with the database system, a corresponding list of actions, a first action in the list of actions being associated with a first application programming interface (API) of a first application and a second action in the list of actions being associated with a second API of a second application;

providing, to a first client device associated with a first user account, a first graphical user interface (GUI) identifying the first intent, the list of actions, and for at least the first action in the list of actions, a corresponding user-selectable option configurable to indicate activation state of the first action for the first intent in association with the first user account;

processing a first request received from the first client device in association with the user-selectable option, the first request indicating that the first action is activated for the first intent in association with the first user account;

responsive to processing the first request, updating, in association with the first user account, user account specific settings such that the user account specific settings indicate that the first action is activated for the first intent;

processing a second request received in association with the first user account, the second request indicating activation state of the second action for the first intent in association with the first user account;

responsive to processing the second request, updating, in association with the first user account, the user account specific settings such that the user account specific settings indicate activation state of the second action for the first intent;

detecting the first intent in a third request received in association with the first user account;

parsing the third request such that one or more values are obtained; and responsive to detecting the first intent in the third request, executing activated actions associated with the first intent according to the user account specific settings stored in association with the first user account such that the first action is executed via the first API, wherein executing the activated actions includes calling the first API with one or more arguments including the one or more values.

8. The method of claim 7, the method further comprising:

the second request indicating that the second action is not activated for the first intent in association with the first user account;

wherein updating, in association with the first user account, the user account specific settings such that the user account specific settings indicate the activation state of the second action for the first intent includes updating the user account specific settings such that the user account specific settings indicate that the second action is not activated for the first intent;

wherein executing the activated actions does not include executing the second action via the second API.

9. The method of claim 8, the method further comprising: executing a set of reversion actions associated with at least one of the activated actions or the first intent.

10. The method of claim 8, wherein executing the activated actions includes transmitting a message via the first API.

11. The method of claim 8, the method further comprising:

scheduling at least one of the activated actions to be performed at a particular time or responsive to occurrence of a particular condition, the scheduling being performed based, at least in part, on one or more of: one or more tokens or values of the third request, a set of rules associated with one or more of the activated actions, or a set of rules associated with the first intent.

12. The method of claim 8, the method further comprising:

generating a machine learning model using a set of training data;

wherein detecting the first intent includes applying the machine learning model to at least a portion of the third request.

13. A non-transitory computer-readable storage medium comprising computer-readable program code capable of being executed by one or more processors, the program code comprising computer-readable instructions configurable to cause:

retrieving, for a first intent in a plurality of intents associated with the database system, a corresponding list of actions, a first action in the list of actions being associated with a first application programming interface (API) of a first application and a second action in the list of actions being associated with a second API of a second application;

providing, to a first client device associated with a first user account, a first graphical user interface (GUI) identifying the first intent, the list of actions, and for at least the first action in the list of actions, a corresponding user-selectable option configurable to indicate activation state of the first action for the first intent in association with the first user account;

processing a first request received from the first client device in association with the user-selectable option, the first request indicating that the first action is activated for the first intent in association with the first user account;

responsive to processing the first request, updating, in association with the first user account, user account specific settings such that the user account specific settings indicate that the first action is activated for the first intent;

processing a second request received in association with the first user account, the second request indicating activation state of the second action for the first intent in association with the first user account;

responsive to processing the second request, updating, in association with the first user account, the user account specific settings such that the user account specific settings indicate activation state of the second action for the first intent;

detecting the first intent in a third request received in association with the first user account;

parsing the third request such that one or more values are obtained; and responsive to detecting the first intent in the third request, executing activated actions associated with the first intent according to the user account specific settings stored in association with the first user account such that the first action is executed via the first API, wherein executing the activated actions includes calling the first API with one or more arguments including the one or more values.

14. The non-transitory computer-readable storage medium of claim 13, the program code comprising computer-readable instructions further configurable to cause: the second request indicating that the second action is not activated for the first intent in association with the first user account;
   wherein updating, in association with the first user account, the user account specific settings such that the user account specific settings indicate the activation state of the second action for the first intent includes updating the user account specific settings such that the user account specific settings indicate that the second action is not activated for the first intent;
   wherein executing the activated actions does not include executing the second action via the second API.

15. The non-transitory computer-readable storage medium non-transitory computer-readable storage medium of claim 13, the program code comprising computer-readable instructions further configurable to cause:
   executing a set of reversion actions associated with at least one of the activated actions or the first intent.

16. The non-transitory computer-readable storage medium of claim 15, wherein executing the activated actions includes transmitting a message via the first API.

17. The non-transitory computer-readable storage medium of claim 15, the program code comprising computer-readable instructions further configurable to cause:
   scheduling at least one of the activated actions to be performed at a particular time or responsive to occurrence of a particular condition, the scheduling being performed based, at least in part, on one or more of: one or more tokens or values of the third request, a set of rules associated with one or more of the activated actions, or a set of rules associated with the first intent.

* * * * *